United States Patent
Accardo et al.

(10) Patent No.: US 10,642,858 B2
(45) Date of Patent: *May 5, 2020

(54) ASSET-DATA INTEGRATION

(71) Applicant: Disney Enterprises, Inc., Burbank, CA (US)

(72) Inventors: Anthony M. Accardo, Los Angeles, CA (US); Walter P. Chatfield, Jr., Boulder, CO (US); Maged Boctor, La Mirada, CA (US); Alexander Marshall, Newbury Park, CA (US)

(73) Assignee: Disney Enterprises, Inc., Burbank, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/948,823

(22) Filed: Apr. 9, 2018

(65) Prior Publication Data

US 2018/0225347 A1 Aug. 9, 2018

Related U.S. Application Data

(63) Continuation of application No. 14/815,677, filed on Jul. 31, 2015, now Pat. No. 9,965,532.

(60) Provisional application No. 62/147,169, filed on Apr. 14, 2015.

(51) Int. Cl.
*G06F 17/30* (2006.01)
*G06F 16/25* (2019.01)

(52) U.S. Cl.
CPC .................. *G06F 16/258* (2019.01)

(58) Field of Classification Search
CPC ....................................... G06F 16/258
USPC ................................. 707/600–899
See application file for complete search history.

(56) References Cited

U.S. PATENT DOCUMENTS 6,151,601 A * 11/2000 Papierniak ............. G06Q 30/02

* cited by examiner

*Primary Examiner* — Isaac M Woo
(74) *Attorney, Agent, or Firm* — Farjami & Farjami LLP

(57) ABSTRACT

There is provided a system including a processor and a memory, storing an asset-data synthesis unit having a data translation module and a data integration module. The processor executes the asset-data synthesis unit to receive a first and a second domain specific asset description data being expressed using different descriptive vocabularies, translate the first and second domain specific asset description data to a common descriptive vocabulary to produce respective first and second common format asset description data, inferentially identify based on probabilistic inference that the first and second common format asset description data describe a same asset, integrate the first and second common format asset description data to produce an integrated asset description data describing the same asset, and generate a synthesized data describing the same asset and linking the integrated asset description data and the first and second domain specific asset description data.

20 Claims, 3 Drawing Sheets

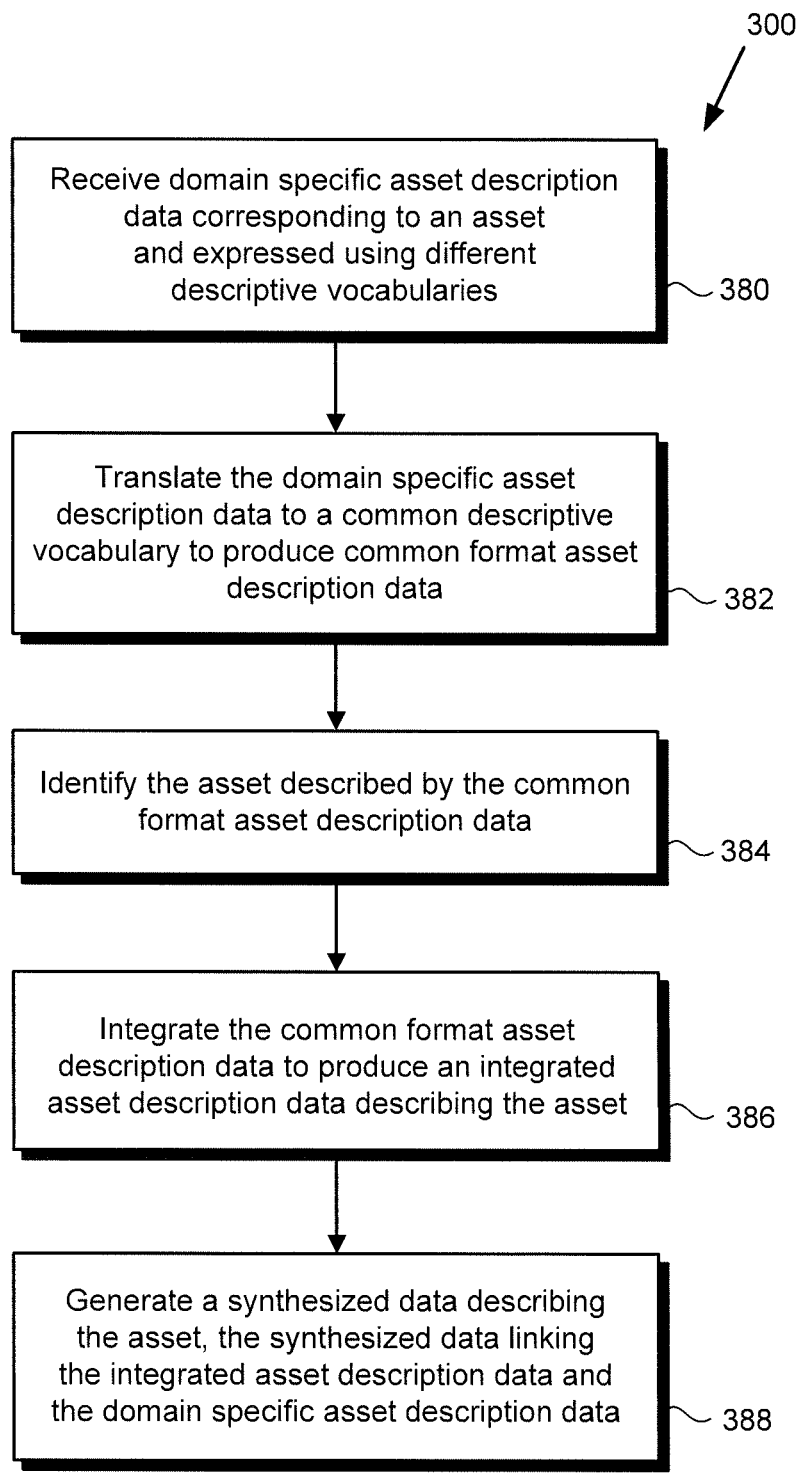

ASSET-DATA INTEGRATION

RELATED APPLICATION(S)

The present application is a Continuation of U.S. application Ser. No. 14/815,677, filed Jul. 31, 2015, which claims the benefit of and priority to a Provisional Patent Application Ser. No. 62/147,169, filed Apr. 14, 2015, and titled "Conceptual Named Resource Gateway," which is hereby incorporated fully by reference into the present application.

BACKGROUND

Asset classification and metadata governance systems have traditionally been structured as hierarchical taxonomies. Because such traditionally structured systems are static and fail to allow for dynamic data models, users of those systems typically encounter significant problems in terms of asset categorization, organization, and retrieval. Although the limitations imposed by these hierarchically structured taxonomies may be tolerable for a single data repository used in isolation, problems may become intractable when attempting to govern data across multiple independent data domains. For example, it becomes difficult and in some instances impracticable to resolve unique asset identifiers across systems and to govern vocabulary across the various domains.

SUMMARY

There are provided asset-data integration systems and methods, substantially as shown in and/or described in connection with at least one of the figures, and as set forth more completely in the claims.

BRIEF DESCRIPTION OF THE DRAWINGS

FIG. 3 is a flowchart presenting an exemplary method for use by an asset-data integration system.

DETAILED DESCRIPTION

Figure 1:
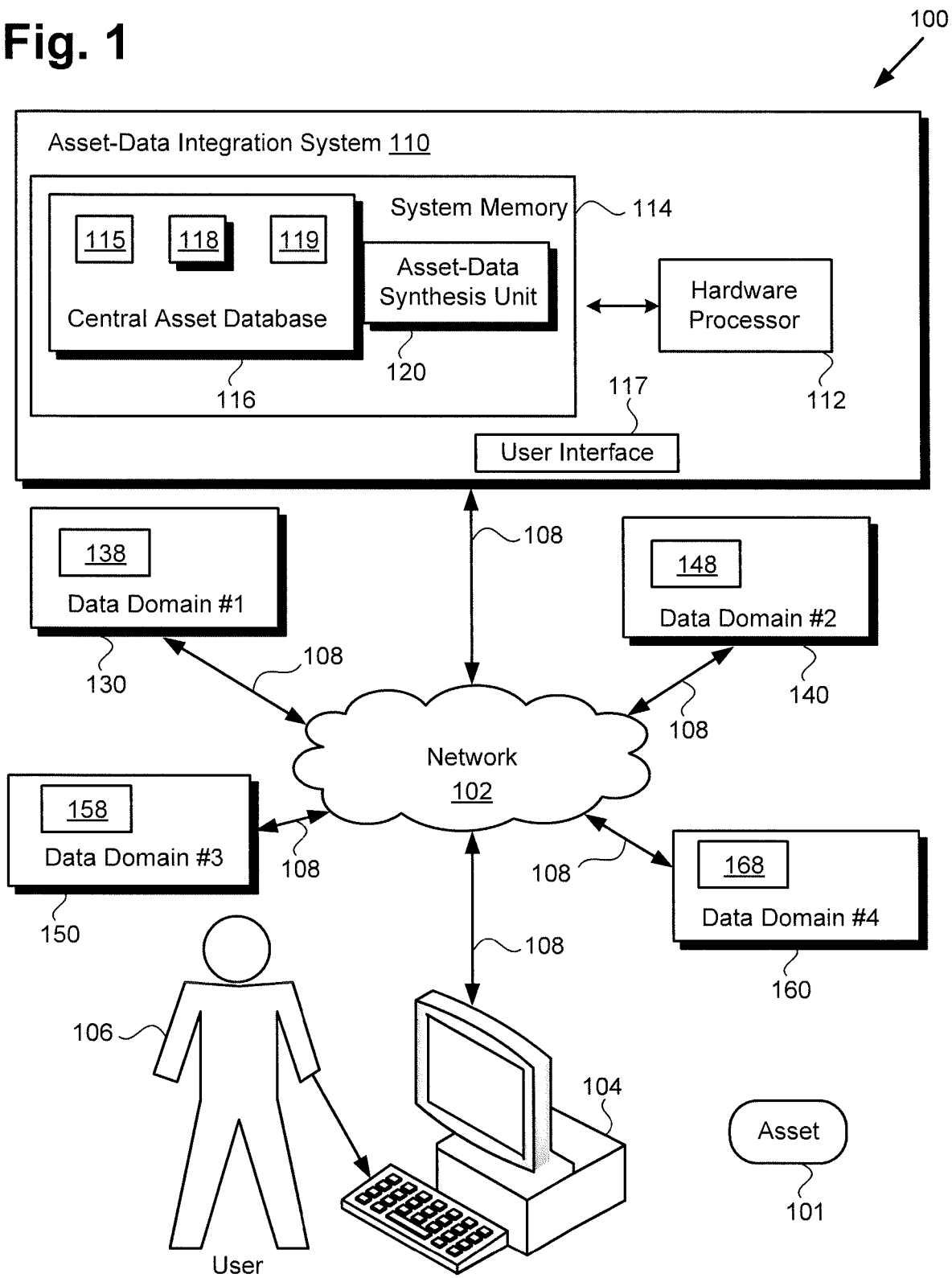
FIG. 1 shows a diagram of one exemplary implementation of an asset-data integration system.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application describes systems and methods for ontologically organizing data entries corresponding to an asset, i.e., substantially the same asset, across multiple data domains, several or all of which may employ distinct descriptive vocabularies and organizational formats. As a result, the solutions disclosed in the present application provide systems and methods for identifying data corresponding to an asset (hereinafter "asset description data" or "asset-data") but residing in separate data domains structured as hierarchical taxonomies. In addition, the solutions disclosed in the present application include transforming that asset description data into a semantic ontology capable of governing and searching across all of the separate data domains. Moreover, the present systems and methods may be configured to provide the ontological transformation and search functionality in real-time.

For example, the systems and methods disclosed herein may begin by generating a conceptual nomenclature defining concepts at an abstract level that will ultimately govern the asset description data and the transformed asset description data, and to create vocabularies that can be used to describe the asset description data and the transformed asset description data. The conceptual nomenclature is determined and managed in an asset-data integration system that includes an asset-data synthesis unit. The asset-data synthesis unit defines the ontological ecosystem within which the asset description data and the transformed asset description data resides.

As a result, the systems and methods disclosed in the present application can provide a powerful tool for identifying and aggregating asset description data from disparate data domains using a single search strategy and a common, consolidated descriptive vocabulary. It is noted that the systems and methods disclosed in the present application may be utilized to search across many independent data domains for asset description data corresponding to a wide variety of assets. For example, as used in the present application, the term "asset" may refer to tangible things such as persons or objects, or to intangible assets, such as intellectual property or data. Additional specific examples of assets to which the present inventive concepts may apply include persons, organizations, media content, such as television (TV) content, movies, games, and music content, real or personal property holdings, vacation packages, and theme park attractions, to name a few.

Referring to FIG. 1, FIG. 1 shows a diagram of one exemplary implementation of an asset-data integration system. As shown in FIG. 1, asset-data integration system 110 is utilized in communications environment 100, and includes hardware processor 112, system memory 114, and user interface 117. System memory 114 has asset-data synthesis unit 120 and central asset database 116 including synthesized data 118 stored therein. In addition, central asset database 116 is shown to store database entries 115 and 119, either or both of which may be synthesized data analogous to synthesized data 118, for example.

As further shown in FIG. 1, communication environment 100 also includes network 102 interactively linking asset-data integration system 110 with first data domain 130, second data domain 140, third data domain 150, fourth data domain 160, and user system 104, via network communication links 108. Also shown in FIG. 1 are asset 101, which may take the form of media content, for example, as well as first asset description data 138, second asset description data 148, third asset description data 158, fourth asset description data 168, and system user 106. It is noted that any or all of first asset description data 138, second asset description data 148, third asset description data 158, and fourth asset description data 168 may be in the form of metadata, for example.

It is noted that although FIG. 1 depicts asset-data synthesis unit 120 and central asset database 116 as being mutually co-located in system memory 114, that representation is merely provided as an aid to conceptual clarity. More generally, asset-data integration system 110 may include one or more computing platforms, such as computer servers for example, which may be co-located, or may form an interactively linked but distributed system, such as a cloud based system, for instance. As a result, hardware processor 112 and system memory 114 may correspond to distributed processor and memory resources within asset-data integration system 110. Thus, it is to be understood that asset-data synthesis unit 120 and central asset database 116 may be stored remotely from one another within the distributed memory resources of asset-data integration system 110.

According to the implementation shown by FIG. 1, system user 106 may utilize user system 104 to interact with asset-data integration system 110 over network 102. In one such implementation, asset-data integration system 110 may correspond to one or more web servers, accessible over a packet network such as the Internet, for example. Alternatively, asset-data integration system 110 may correspond to one or more computer servers supporting a local area network (LAN), or included in another type of limited distribution network. It is noted that although user system 104 is shown as a personal computer (PC) in FIG. 1, that representation is also provided merely as an example. In other implementations, user system 104 may be any other suitable mobile or stationary computing device or system.

Figure 2:
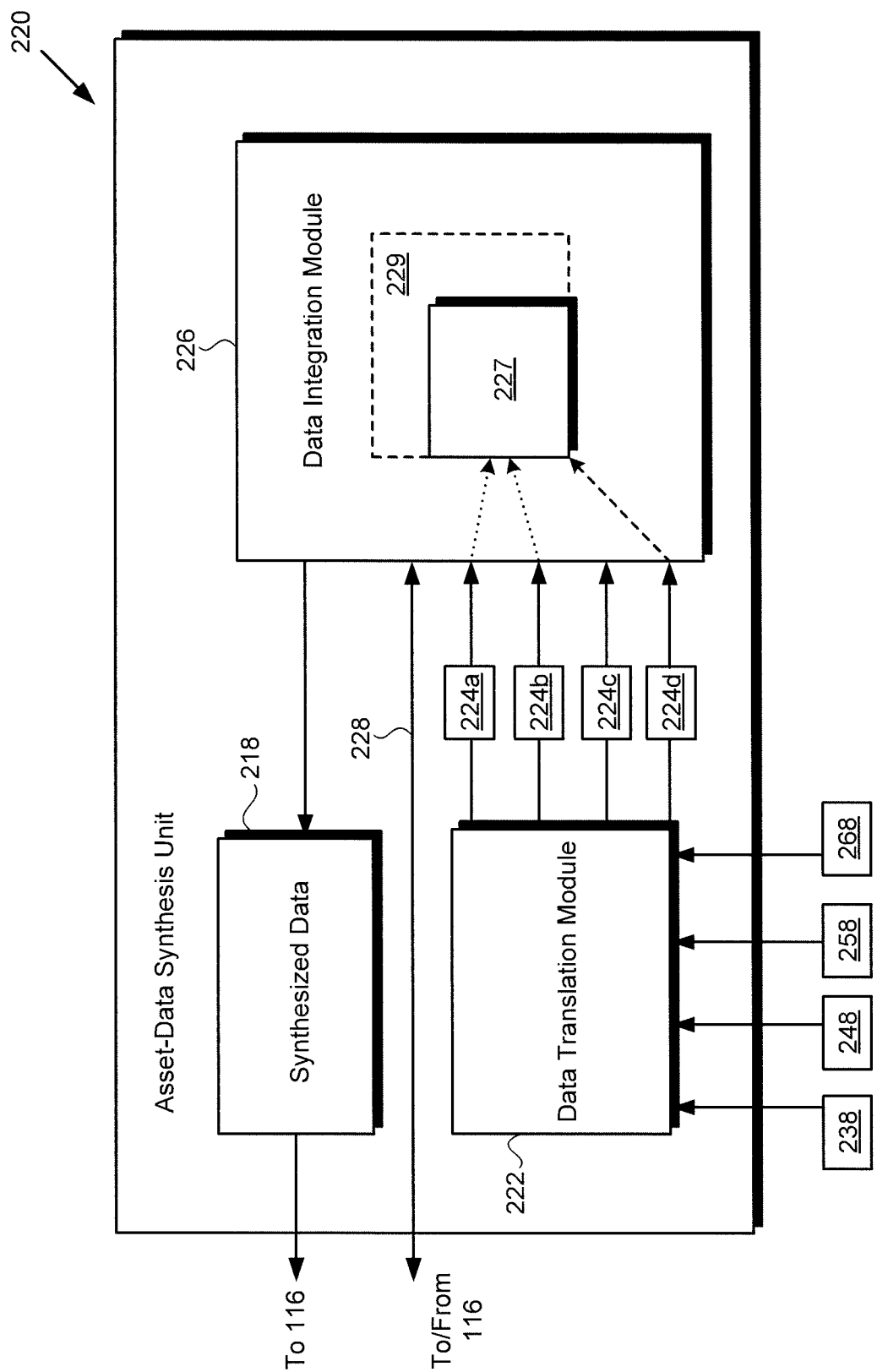
FIG. 2 shows a more detailed representation of an asset-data synthesis unit suitable for use in the asset-data integration system of FIG. 1, according to one exemplary implementation.

Continuing to FIG. 2, FIG. 2 shows a more detailed representation of asset-data synthesis unit 220 suitable for use in asset-data integration system 110 in FIG. 1, according to one exemplary implementation. As shown in FIG. 2, asset-data synthesis unit 220 includes data translation module 222 configured to receive some or all of first asset description data 238, second asset description data 248, third asset description data 258, and fourth asset description data 268. As further shown in FIG. 2, asset-data synthesis unit 220 also includes data integration module 226 configured to receive some or all of first common format asset description data 224*a*, second common format asset description data 224*b*, third common format asset description data 224*c*, and fourth common format asset description data 224*d* produced by data translation module 222.

Also shown in FIG. 2 are integrated asset description data 227, synthesized data 218, reintegrated asset description data 229, and communication link 228 representing ongoing communication between data integration module 226 and central asset database 116, in FIG. 1. Asset data synthesis unit 220 and synthesized data 218 generated by asset data synthesis unit 220, in FIG. 2, correspond respectively in general to asset data synthesis unit 120 and synthesized data 118, in FIG. 1, and may share any of the characteristics attributed to those corresponding features in the present application. In addition, first asset description data 238, second asset description data 248, third asset description data 258, and fourth asset description data 268, correspond respectively in general to first asset description data 138, second asset description data 148, third asset description data 158, and fourth asset description data 168, in FIG. 1, and may share any of the characteristics attributed to those corresponding features in the present application.

FIGS. 1 and 2 will now be further described by reference to FIG. 3, which presents flowchart 300 describing an exemplary method for use by an asset-data integration system. With respect to the method outlined in FIG. 3, it is noted that certain details and features have been left out of flowchart 300 in order not to obscure the discussion of the inventive features in the present application.

Referring to FIG. 3 in combination with FIGS. 1 and 2, flowchart 300 begins with receiving domain specific asset description data corresponding to asset 101 and expressed using different descriptive vocabularies (action 380). Hardware processor 112 of asset-data integration system 110 may be configured to execute asset-data synthesis unit 120/220 to receive asset description data corresponding to asset 101 over network 102. That asset description data may take the form of any or all of first asset description data 138/238 provided by first data domain 130, second asset description data 148/248 provided by second data domain 140, third asset description data 158/258 provided by third data domain 150, and fourth asset description data 168/268 provided by fourth data domain 160.

First data domain 130, second data domain 140, third data domain 150, and fourth data domain 160 may be structured as traditional hierarchical taxonomies, for example. Moreover, because first data domain 130, second data domain 140, third data domain 150, and fourth data domain 160 are independent of one another, first asset description data 138/238, second asset description data 148/248, third asset description data 158/258, and fourth asset description data 168/268 may be domain specific asset description data. That is to say, each of respective first asset description data 138/238, second asset description data 148/248, third asset description data 158/258, and fourth asset description data 168/268 may be expressed using a different descriptive vocabulary specific to the respective data domain in which it resides.

Flowchart 300 continues with translating the domain specific asset description data to a common descriptive vocabulary to produce common format asset description data (action 382). For example, asset-data integration system 110 may be configured to utilize asset-data synthesis unit 120/220 to normalize the domain specific asset description data received from first data domain 130 and/or second data domain 140 and/or third data domain 150 and/or fourth data domain 160. Thus, hardware processor 112 may be further configured to execute asset-data synthesis unit 120/220 to translate first asset description data 138/238 and/or second asset description data 148/248 and/or third asset description data 158/258 and/or fourth asset description data 168/268 to a common descriptive vocabulary.

One example of such a process uses a canonical data model (CDM) as a common reference for translating first asset description data 138/238 and/or second asset description data 148/248 and/or third asset description data 158/258 and/or fourth asset description data 168/268. As shown in FIG. 2, translation of first asset description data 138/238 and/or second asset description data 148/248 and/or third asset description data 158/258 and/or fourth asset description data 168/268 may be performed using data translation module 222 of asset-data synthesis unit 120/220.

As further shown in FIG. 2, data translation module 222 may be configured to produce first common format asset description data 224*a* through translation of first asset description data 138/238, as well as second common format asset description data 224*b* through translation of second asset description data 148/248. In addition, data translation module 222 may be configured to produce third common format asset description data 224*c* through translation of third asset description data 158/258, and to produce fourth common format asset description data 224*d* through translation of fourth asset description data 168/268.

Flowchart 300 continues with identifying an asset described by the common format asset description data (action 384). Hardware processor 112 may be configured to execute asset-data synthesis unit 120/220 to identify some or all of first common format asset description data 224*a*, second common format asset description data 224*b*, third common format asset description data 224*c*, and fourth common format asset description data 224*d* as describing the same asset, e.g., asset 101. For example, asset-data synthesis unit 120/220 may identify first common format asset description data 224*a* and second common format asset description data 224*b* as describing asset 101, but may identify third common format asset description data 224*c* as describing another asset.

In some implementations, asset-data synthesis unit 120/220 may be configured to identify first common format asset description data 224*a* and second common format asset description data 224*b* as describing asset 101 inferentially. Such inferencing, when performed using asset-data synthesis unit 120/220 may be absolute or probabilistic. For example, in implementations in which asset-data synthesis unit 120/220 performs only absolute inferencing, the inferential identification of asset 101 based on first common format asset description data 224*a* and second common format asset description data 224*b* may only occur where the likelihood of accuracy is substantially one hundred percent. However, in some implementations, it may be advantageous or desirable to enable probabilistic inferencing by asset-data synthesis unit 120/220.

In those latter implementations, asset-data synthesis unit 120/220 may be configured to infer that asset 101 is the asset being described by both first common format asset description data 224*a* and second common format asset description data 224*b* when the likelihood of accuracy meets or exceeds a confidence threshold of less than one hundred percent. Moreover, in some implementations, asset-data synthesis unit 120/220 may be configured to have machine learning capabilities, thereby enabling the knowledge base used by asset-data synthesis unit 120/220 to inferentially identify asset 101 to evolve over time.

Flowchart 300 continues with integrating the common format asset description data to produce an integrated asset description data describing asset 101 (action 386). For example, according to the exemplary use case described above, asset-data synthesis unit 120/220 may identify first common format asset description data 224*a* and second common format asset description data 224*b* as describing asset 101. In that case, hardware processor 112 may be further configured to execute asset-data synthesis unit 120/220 to utilize data integration module 226 to integrate first common format asset description data 224*a* and second common format asset description data 224*b* to produce integrated asset description data 227 describing asset 101.

For example, first common format asset description data 224*a* and second common format asset description data 224*b* may be recreated into a graphical representation. Such a graphical representation may take the form of a consolidated graph corresponding to the attributes of asset 101 described by first common format asset description data 224*a* and second common format asset description data 224*b*. The graphical representation may be semantic, meaning it may contain new data based on relationships between first common format asset description data 224*a* and second common format asset description data 224*b*. That new data is a product of the ontology logic employed by data integration module 226.

Flowchart 300 can conclude with generating synthesized data 118/218 describing asset 101 (action 388). Hardware processor 112 may be configured to execute asset-data synthesis unit 120/220 to generate synthesized data 118/218 describing asset 101, such that synthesized data 118/218 links integrated asset description data 227 and first and second domain specific asset description data 138/238 and 148/248. Furthermore, hardware processor 112 may also be configured to execute asset-data synthesis unit 120/220 to store synthesized data 118/218 in central asset database 116.

Although not shown in flowchart 300, in some implementations the systems and methods disclosed in the present application can include use of user interface 117 by asset-data integration system 110 to display synthesized data 118/218 linking integrated asset description data 227 and first and second domain specific asset description data 138/238 and 148/248 to system user 106. In cases where system user 106 is an authorized knowledge base manager of asset-data integration system 110, hardware processor 112 may be configured to execute asset-data synthesis unit 120/220 to solicit confirmation data regarding synthesized data 118/218 from system user 106. Moreover, in one implementation, hardware processor 112 may be configured to execute asset-data synthesis unit 120/220 to modify synthesized data 118/218 based on an asset correction data received through user interface 117.

As noted above, asset-data integration system 110 can provide a powerful tool for identifying and aggregating asset description data from disparate data domains using a single search strategy and a common, consolidated descriptive vocabulary. As a result, hardware processor 112 may be further configured to execute asset-data synthesis unit 120/220 to receive an asset search data describing multiple asset attributes through user interface 117, and to search central asset database 116 for at least one database entry corresponding to the search data. Where one or more of the asset attributes described by the search data are included in synthesized data 118/218, for example, hardware processor 112 may be configured to execute asset-data synthesis unit 120/220 to determine that asset 101 corresponds to the search data, and to identify asset 101 to system user 106. In addition, or alternatively, where one or more of the asset attributes described by the search data are included in synthesized data 118/218, hardware processor 112 may be configured to execute asset-data synthesis unit 120/220 to display synthesized data 118/218 to system user 106, via user interface 117.

It is noted that asset-data integration system 110 may be configured to dynamically update synthesized data 118/218 based on additional asset description data corresponding to asset 101 and received by asset-data integration system 110 after generation of synthesized data 118/218. For example, hardware processor 112 may be configured to execute asset-data synthesis unit 120/220 to receive another domain specific asset description data, which may be expressed using another descriptive vocabulary, e.g., fourth asset description data 168/268, and to translate fourth asset description data 168/268 to produce fourth common format asset description data 224*d*.

Hardware processor 112 may be further configured to execute asset-data synthesis unit 120/220 to identify fourth common format asset description data 224*d* as describing asset 101, and to integrate fourth common format asset description data 224*d* with integrated asset description data 227 to produce reintegrated asset description data 229. In addition, hardware processor 112 may be configured to execute asset-data synthesis unit 120/220 to update synthesized data 118/218 describing asset 101 to link reintegrated asset description data 229 with first and second domain specific asset description data 138/238 and 148/248, and fourth domain specific asset description data 168/268.

As noted above, asset-data synthesis unit 120/220 is configured to define the governing ontology by which the asset description data and the transformed asset description data are organized. In some implementations, that governing ontology may be designed to evolve in response to production of reintegrated asset description data 229 and/or updating of synthesized data 118/218. For example, in those implementations, hardware processor 112 may be configured to execute asset-data synthesis unit 120/220 to extend or otherwise modify the governing ontology to incorporate one or more new conceptual relationships identified in the process of producing reintegrated asset description data 229 and/or updating synthesized data 118/218.

Furthermore, in some implementations, the extension of or modification to the governing ontology defined by asset-data synthesis unit 120/220 may be automatically propagated to database entries stored in central asset database 116. In other words, the production of reintegrated asset description data 229 and/or the updating of synthesized data 118 may trigger a modification to the governing ontology defined and imposed by asset-data synthesis unit 120/220 that may in turn cause database entries 115 and/or 119 to be correspondingly updated automatically.

Thus, the asset-data integration solution disclosed in the present application is configured to ontologically organize data entries corresponding to the same asset across multiple data domains, several or all of which may employ distinct descriptive vocabularies and organizational formats. As a result, the solution disclosed in the present application provides systems and methods for identifying asset description data corresponding to the same asset but residing in separate data domains structured as hierarchical taxonomies. In addition, the solution disclosed in the present application includes transforming that asset description data into a semantic ontology capable of governing and searching across all of the separate data domains. Moreover, the present systems and methods are configured to provide that ontological transformation and search functionality in real-time. Moreover, the systems and methods disclosed in the present application may be utilized to search across independent data domains for asset description data corresponding to a wide variety of assets. For example, assets to which the present inventive concepts may apply include persons, organizations, media content, such as TV content, movies, games, and music content, real or personal property holdings, vacation packages, and theme park attractions, to name a few.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An asset-data integration system comprising:
   a hardware processor and a system memory;
   an asset-data synthesis unit stored in the system memory;
   wherein the hardware processor is configured to execute the asset-data synthesis unit to:
   receive a first domain specific asset description data and a second domain specific asset description data, the first domain specific asset description data and the second domain specific asset description data being expressed using different descriptive vocabularies;
   translate the first domain specific asset description data and the second domain specific asset description data to a common descriptive vocabulary to produce a first common format asset description data and a second common format asset description data, respectively;
   inferentially identify, based on probabilistic inference, that the first common format asset description data and the second common format asset description data describe a same asset;
   integrate the first common format asset description data and the second common format asset description data to produce an integrated asset description data describing the same asset;
   generate a synthesized data describing the same asset, the synthesized data linking the integrated asset description data, the first domain specific asset description data, and the second domain specific asset description data;
   receive a third domain specific asset description data;
   translate the third domain specific asset description data to the common descriptive vocabulary to produce a third common format asset description data;
   inferentially identify, based on probabilistic inference, that the third common format asset description data describes the same asset;
   integrate the third common format asset description data with the integrated asset description data to produce a re-integrated asset description data; and
   update the synthesized data describing the same asset to link the re-integrated asset description data with the first domain specific asset description data, the second domain specific asset description data, and the third domain specific asset description data.

2. The asset-data integration system of claim 1, wherein the hardware processor is further configured to execute the asset-data synthesis unit to display the synthesized data to a system user.

3. The asset-data integration system of claim 1, wherein the hardware processor is further configured to execute the asset-data synthesis unit to modify the synthesized data based on an asset correction data received from a system user.

4. The asset-data integration system of claim 1, wherein the hardware processor is further configured to execute the asset-data synthesis unit to modify a governing ontology defined by the asset-data synthesis unit based on at least one of the re-integrated asset description data or the synthesized data.

5. The asset-data integration system of claim 1, further comprising a central asset database stored in the system memory, the hardware processor being further configured to execute the asset-data synthesis unit to store the synthesized data in the central asset database.

6. A method for use by an asset-data integration system having a hardware processor, the method comprising:
   receiving, using the hardware processor, a first domain specific asset description data and a second domain specific asset description data, the first domain specific asset description data and the second domain specific asset description data being expressed using different descriptive vocabularies;

translating, using the hardware processor, the first domain specific asset description data and the second domain specific asset description data to a common descriptive vocabulary to produce a first common format asset description data and a second common format asset description data, respectively;

inferentially identifying, using the hardware processor, based on probabilistic inference, that the first common format asset description data and the second common format asset description data describe a same asset;

integrating, using the hardware processor, the first common format asset description data and the second common format asset description data to produce an integrated asset description data describing the same asset;

generating, using the hardware processor, a synthesized data describing the same asset, the synthesized data linking the integrated asset description data, the first domain specific asset description data, and the second domain specific asset description data;

receiving, using the hardware processor, a third domain specific asset description data;

translating, using the hardware processor, the third domain specific asset description data to the common descriptive vocabulary to produce a third common format asset description data;

inferentially identifying, using the hardware processor, based on probabilistic inference, that the third common format asset description data describes the same asset;

integrating, using the hardware processor, the third common format asset description data with the integrated asset description data to produce a re-integrated asset description data; and updating, using the hardware processor, the synthesized data describing the same asset to link the re-integrated asset description data with the first domain specific asset description data, the second domain specific asset description data, and the third domain specific asset description data.

7. The method of claim 6, further comprising displaying, using the hardware processor, the synthesized data to a system user.

8. The method of claim 6, further comprising modifying, using the hardware processor, the synthesized data based on an asset correction data received from a system user.

9. The method of claim 6, further comprising modifying, using the hardware processor, a governing ontology, based on at least one of the re-integrated asset description data or of the synthesized data.

10. The method of claim 6, further comprising storing, using the hardware processor, the synthesized data in a central asset database of the asset-data integration system.

11. An asset-data integration system comprising:
a hardware processor configured to:
  receive a first domain specific asset description data and a second domain specific asset description data, the first domain specific asset description data and the second domain specific asset description data being expressed using different descriptive vocabularies;
  translate the first domain specific asset description data and the second domain specific asset description data to a common descriptive vocabulary to produce a first common format asset description data and a second common format asset description data, respectively;
  determine that the first common format asset description data and the second common format asset description data describe a same asset;
  integrate the first common format asset description data and the second common format asset description data to produce an integrated asset description data describing the same asset;
  generate a synthesized data describing the same asset, the synthesized data linking the integrated asset description data, the first domain specific asset description data, and the second domain specific asset description data;
  receive a third domain specific asset description data;
  translate the third domain specific asset description data to the common descriptive vocabulary to produce a third common format asset description data;
  determine that the third common format asset description data describes the same asset;
  integrate the third common format asset description data with the integrated asset description data to produce a re-integrated asset description data; and
  update the synthesized data describing the same asset to link the re-integrated asset description data with the first domain specific asset description data, the second domain specific asset description data, and the third domain specific asset description data.

12. The asset-data integration system of claim 11, wherein the hardware processor is further configured to display the synthesized data to a system user.

13. The asset-data integration system of claim 11, wherein the hardware processor is further configured to modify the synthesized data based on an asset correction data received from a system user.

14. The asset-data integration system of claim 11, wherein the hardware processor is further configured to modify a governing ontology based on at least one of the re-integrated asset description data or the synthesized data.

15. The asset-data integration system of claim 11, further comprising a central asset database stored in the system memory, wherein the hardware processor is further configured to store the synthesized data in the central asset database.

16. A method for use by an asset-data integration system having a hardware processor, the method comprising:
  receiving, using the hardware processor, a first domain specific asset description data and a second domain specific asset description data, the first domain specific asset description data and the second domain specific asset description data being expressed using different descriptive vocabularies;
  translating, using the hardware processor, the first domain specific asset description data and the second domain specific asset description data to a common descriptive vocabulary to produce a first common format asset description data and a second common format asset description data, respectively;
  determining, using the hardware processor, that the first common format asset description data and the second common format asset description data describe a same asset;
  integrating, using the hardware processor, the first common format asset description data and the second common format asset description data to produce an integrated asset description data describing the same asset;
  generating, using the hardware processor, a synthesized data describing the same asset, the synthesized data linking the integrated asset description data, the first domain specific asset description data, and the second domain specific asset description data;

receiving, using the hardware processor, a third domain specific asset description data;

translating, using the hardware processor, the third domain specific asset description data to the common descriptive vocabulary to produce a third common format asset description data;

determining, using the hardware processor, that the third common format asset description data describes the same asset;

integrating, using the hardware processor, the third common format asset description data with the integrated asset description data to produce a re-integrated asset description data; and updating, using the hardware processor, the synthesized data describing the same asset to link the re-integrated asset description data with the first domain specific asset description data, the second domain specific asset description data, and the third domain specific asset description data.

17. The method of claim 16, further comprising displaying, using the hardware processor, the synthesized data to a system user.

18. The method of claim 16, further comprising modifying, using the hardware processor, the synthesized data based on an asset correction data received from a system user.

19. The method of claim 16, further comprising modifying, using the hardware processor, a governing ontology, based on at least one of the re-integrated asset description data or the synthesized data.

20. The method of claim 16, further comprising storing, using the hardware processor, the synthesized data in a central asset database of the asset-data integration system.

* * * * *